United States Patent
Gupte et al.

(10) Patent No.: US 8,874,954 B1
(45) Date of Patent: Oct. 28, 2014

(54) COMPATIBILITY OF HIGH AVAILABILITY CLUSTERS SUPPORTING APPLICATION FAILOVER WITH SHARED STORAGE IN A VIRTUALIZATION ENVIRONMENT WITHOUT SACRIFICING ON VIRTUALIZATION FEATURES

(71) Applicant: Symantec Corporation, Mountain View, CA (US)

(72) Inventors: Amit Gupte, Pune (IN); Jahangir Ahmad, Pune (IN); Lorenzo Galelli, Cuxton (GB); Mohini Rahalkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 187 days.

(21) Appl. No.: 13/655,848

(22) Filed: Oct. 19, 2012

(51) Int. Cl.
*G06F 11/00* (2006.01)
*G06F 11/20* (2006.01)

(52) U.S. Cl.
CPC ................... *G06F 11/2028* (2013.01)
USPC .............................. 714/4.11; 714/1

(58) Field of Classification Search
CPC .................................. G06F 11/2025
USPC ........................ 714/4.11, 1, 4.1, 6.3, 10–13
See application file for complete search history.

(56) References Cited

U.S. PATENT DOCUMENTS

| | | | |
|---|---|---|---|
| 7,246,256 B2* | 7/2007 | De La Cruz et al. .......... | 714/4.11 |
| 8,554,981 B2* | 10/2013 | Schmidt et al. ................... | 711/6 |
| 2008/0189700 A1* | 8/2008 | Schmidt et al. ................... | 718/1 |
| 2010/0211829 A1* | 8/2010 | Ziskind et al. .................. | 714/48 |
| 2012/0311576 A1* | 12/2012 | Shu et al. ........................ | 718/1 |

OTHER PUBLICATIONS

"VMware vMotion for Live Migration of Virtual Machines," 2 pages. VMware, Aug. 15, 2012.
"VMware Storage VMotion, Live Migration of Virtual Machine Disk Files," 2 pages. VMware, Aug. 15, 2012.
"Distributed Resource Scheduling, Distributed Power Management of Server Resources," 2 pages. VMware, Aug. 15, 2012.
"VMware High Availability (HA), Restart Your Virtual Machines for Business Continuity," 2 pages. VMware, Aug. 15, 2012.
"MSCS Clustering," Document No. X0327902, 19 pages. Microsoft, 1997.
"VMware vSphere Brochure," 8 pages. VMware, 2011.
"VMware ESX and VMware ESXi Product Datasheet," 6 pages. VMware, 2009.
"White Paper on High Availability for Mission-Critical Applications Protecting Applications with Veritas Cluster Server," 16 pages. Symantec, 2007.

* cited by examiner

*Primary Examiner* — Dieu-Minh Le
(74) *Attorney, Agent, or Firm* — Brill Law Office; Jeffrey Brill (57) ABSTRACT

Compatibility is provided between a high availability clustering system and a virtualization environment. A hardware level hypervisor runs on each host, and VM(s) run on each hypervisor. A shared virtual storage manager runs on each VM, and facilitates sharing virtual storage between VMs. Sharing virtual storage can be performed in the context of a failed application or VM. A shared virtual storage manager VM detects that the application is being failed over from the source VM to the target VM, detaches the virtual storage from the source VM, and attaches it to the target VM. The shared virtual storage manager can also enable sharing of the virtual storage when a monitored application is failed over in response to the failure of a hypervisor. Virtual storage can additionally act as an arbitrator to resolve an occurrence of split brain, when VMs become disconnected.

20 Claims, 7 Drawing Sheets

COMPATIBILITY OF HIGH AVAILABILITY CLUSTERS SUPPORTING APPLICATION FAILOVER WITH SHARED STORAGE IN A VIRTUALIZATION ENVIRONMENT WITHOUT SACRIFICING ON VIRTUALIZATION FEATURES

TECHNICAL FIELD

This disclosure pertains generally to application high availability, and more specifically to supporting extended features of a vSphere (or similar) virtualization environment in conjunction with a high availability clustering system.

BACKGROUND

High-availability clusters (also known as HA clusters or failover clusters) are groups of computers that support running server applications with a minimum of downtime. A high-availability cluster uses groups of redundant computing resources in order to provide continued service when individual system components fail. More specifically, high-availability clusters eliminate single points of failure by providing multiple servers, multiple network connections, redundant data storage, etc.

Absent clustering, if a server running a particular application fails, the application would be unavailable until the server is restored. In a high-availability clustering system, the failure of a server (or of a specific computing resource used thereby such as a network adapter, storage device, etc.) is detected, and the application that was being run on the failed server is automatically restarted on another computing system (i.e., another node of the cluster). This process is called "failover." As part of this process, high availability clustering software can configure the node to which the application is being moved, for example mounting a filesystem used by the application, configuring network hardware, starting supporting applications, etc. The high availability clustering system can also detect the failure of the application itself. In this case, a given number of attempts to restart the application are typically made, and if these restart attempts fail, the application is failed over to another node. In effect, the high availability clustering system monitors applications, the servers the applications run on, and the resources used by the applications, to ensure that the applications remain highly available.

Virtualization of computing devices can be employed in high availability clustering and in other contexts. One or more virtual machines (VMs or guests) can be instantiated at a software level on physical computers (host computers or hosts), such that each VM runs its own operating system instance. Just as software applications, including server applications such as databases, enterprise management solutions and e-commerce websites, can be run on physical computers, so too can these applications be run on virtual machines. A high availability cluster of VMs can be built, in which the applications being monitored by the high availability clustering system run on and are failed over between VMs, as opposed to physical servers. In other words, the nodes of a high availability cluster can be in the form of VMs.

In some virtualization scenarios, a software component often called a hypervisor can act as an interface between the guests and the host operating system for some or all of the functions of the guests. In other virtualization implementations, there is no underlying host operating system running on the physical, host computer. In those situations, the hypervisor acts as an interface between the guests and the hardware of the host computer, in effect functioning as the host operating system, on top of which the guests run. Even where a host operating system is present, the hypervisor sometimes interfaces directly with the hardware for certain services. In some virtualization scenarios, the host itself is in the form of a guest (i.e., a virtual host) running on another host. The services described herein as being performed by a hypervisor are, under certain virtualization scenarios, performed by a component with a different name, such as "supervisor virtual machine," "virtual machine manager (VMM)," "service partition," or "domain 0 (dom0)." The name used to denote the component(s) performing specific functionality is not important.

Although conventional clustering solutions supporting failover allow high availability clusters of VMs, clustering solutions such as Veritas Cluster Server (VCS) and Microsoft Cluster Server (MSCS) are not conventionally compatible with certain features of virtualization environments such as VMware vSphere. For example, VMware vSphere provides features such as moving VMs between physical servers without downtime (called VMotion), moving VM disk files across shared storage arrays (called Storage VMotion), dynamic resource scheduling (called DRS), snapshots and high availability for virtual machines in the virtualized environment when an underlying hypervisor fails (called VMware HA).

These features of VMware are not conventionally compatible with high availability clusters. In a high availability clustering environment, storage is shared by all the nodes of the cluster, such that the shared storage looks the same to each node. When failing over an application between nodes, the application can only be restarted on a node that has access to its associated data. Therefore, high availability clusters utilize storage that is shared across all the nodes, so that applications can be failed over between nodes of the cluster. Additionally, a cluster volume manager extends volume management across the multiple nodes of a cluster, such that each node recognizes the same logical volume layout, and the same state of all volume resources at all nodes. Under cluster volume management, any changes made to volume configuration from any node in the cluster are recognized by all the nodes of the cluster.

Under a virtualization environment such as VMware, a virtual disk can only be attached to one VM at a time. VMware does not implement the extension of the above described features (e.g., VMotion, Storage VMotion, DRS, snapshots and VMware HA) to support cluster level shared storage and cluster volume management when virtual storage under a VMware environment is used as shared storage in a high availability cluster of VMs. As a result, an administrator is faced with deciding between these VMware features (e.g., VMotion, Storage VMotion, DRS, snaphsots and VMware HA) or the use of a high availability clustering solution such as VCS.

It would be desirable to address this issue.

SUMMARY

Compatibility is provided between a high availability clustering system that supports failover of monitored applications and a virtualization environment that utilizes shared storage. A high availability cluster is provided which comprises at least two nodes, each of which is in the form of a virtual machine (VM). The high availability cluster is instantiated so that both a high availability clustering system and a virtualization environment are provided. The high availability clustering system (e.g., VCS) supports failover of monitored applications, and the virtualization environment (e.g., VMware vSphere) utilizes virtual storage and runs in conjunction with the high availability clustering system. Under the virtualization environment, a hardware level hypervisor such as ESX runs in the system memory of each of one or more physical host computer(s), and one or more VM(s) run on each hardware level hypervisor. A shared virtual storage manager runs on each VM, and facilitates sharing virtual storage of the virtualization environment between multiple VMs, thereby enabling the high availability clustering system (e.g., VCS) to share storage and to failover monitored applications in conjunction with the virtualization environment utilizing virtual storage, without requiring replication of storage media such as data disks.

In some embodiments, sharing virtual storage of the virtualization environment between multiple VMs is performed in the context of a failed monitored application. In this scenario, the specific monitored application is failed over from a source VM to a target VM. The shared virtual storage manager on the target VM detects that the specific monitored application is being failed over from the source VM to the target VM, in response to the failure of the application. In one embodiment, the shared virtual storage manager on the target VM detaches the virtual storage that was being accessed by the application from the source VM, and attaches the virtual storage to the target VM, thereby providing the application with access to the virtual storage on the target VM. In another embodiment, when an application is to be failed over from one VM to another, the source virtual storage manager detaches the shared storage from the source VM and the target virtual storage manager attaches it to the target VM. In one embodiment, the source VM and the target VM are both running on a single hardware level hypervisor on a single host of the high availability cluster. In another embodiment, the source VM is running on a first hardware level hypervisor on a first host of the high availability cluster, and the target VM is running on a second hardware level hypervisor on a second host of the high availability cluster.

In other embodiments, sharing virtual storage of the virtualization environment between multiple VMs is performed in the context of a failed VM. As in the case of a failed application, the failure of a VM on which a monitored application in running results in the failover of the application from a source VM to a target VM. The shared virtual storage manager on the target VM detects that specific monitored application is being failed over from the source VM to the target VM, in response to the failure of the source VM. As with the failed application scenario, in one embodiment the shared virtual storage manager on the target VM detaches the virtual storage that was being accessed by the application from the source VM, and attaches the virtual storage to the target VM, thereby providing the application with access to the virtual storage on the target VM. In another embodiment, the source virtual storage manager detaches the shared storage from the source VM and the target virtual storage manager attaches it to the target VM. The source and target VMs can run on a single hardware level hypervisor on a single host of the high availability cluster, or on separate hardware level hypervisors on separate hosts.

In other embodiments, a monitored application can be failed over between VMs in response to the failure of a first (source) hardware level hypervisor. In one such embodiment, the virtualization environment further provides high availability functionality for VMs running on a failed hardware level hypervisor, through a virtualization environment component such as VMware HA. In this embodiment, responsive to the failure of a source hardware level hypervisor, the virtualization environment component is allowed to failover the VM on the source hardware level hypervisor to a target hardware level hypervisor. VCS recognizes this failure of the source hardware level hypervisor, detaches the storage from the failed VM on the failed hypervisor, and attaches it to the (target) VM which has been failed over to the target hypervisor. It then starts the application on the target VM. In another embodiment, the virtualization environment does not provide high availability functionality for VMs running on a failed hardware level hypervisor (e.g., VMware HA is not present). In this embodiment, responsive to the failure of the source hardware level hypervisor, the monitored application is failed over from the VM running on the source hardware level hypervisor to a separate VM running on the target hardware level hypervisor. The shared virtual storage is detached from the VM running on the source hardware level hypervisor, and attached to the separate VM on the on the target hardware level hypervisor. This provides the monitored application with access to the virtual storage on the separate VM on the target hardware level hypervisor.

In some embodiments, the virtual storage is used as an arbitrator to resolve an occurrence of split brain in the high availability cluster, wherein separate VMs have become communicatively disconnected. In this case, the high availability clustering system attempts to run a specific monitored application on each one of the separate VMs. To use the virtual storage as an arbitrator to resolve the occurrence of split brain, the shared virtual storage manager on the specific one of the VMs on which the specific monitored application is running maintains the attachment between that VM and the shared storage. This prevents the other VMs from being able to attach the virtual storage and run the application, thereby enabling the application to continue to run on the specific VM and remain stable, despite the occurrence of split brain.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
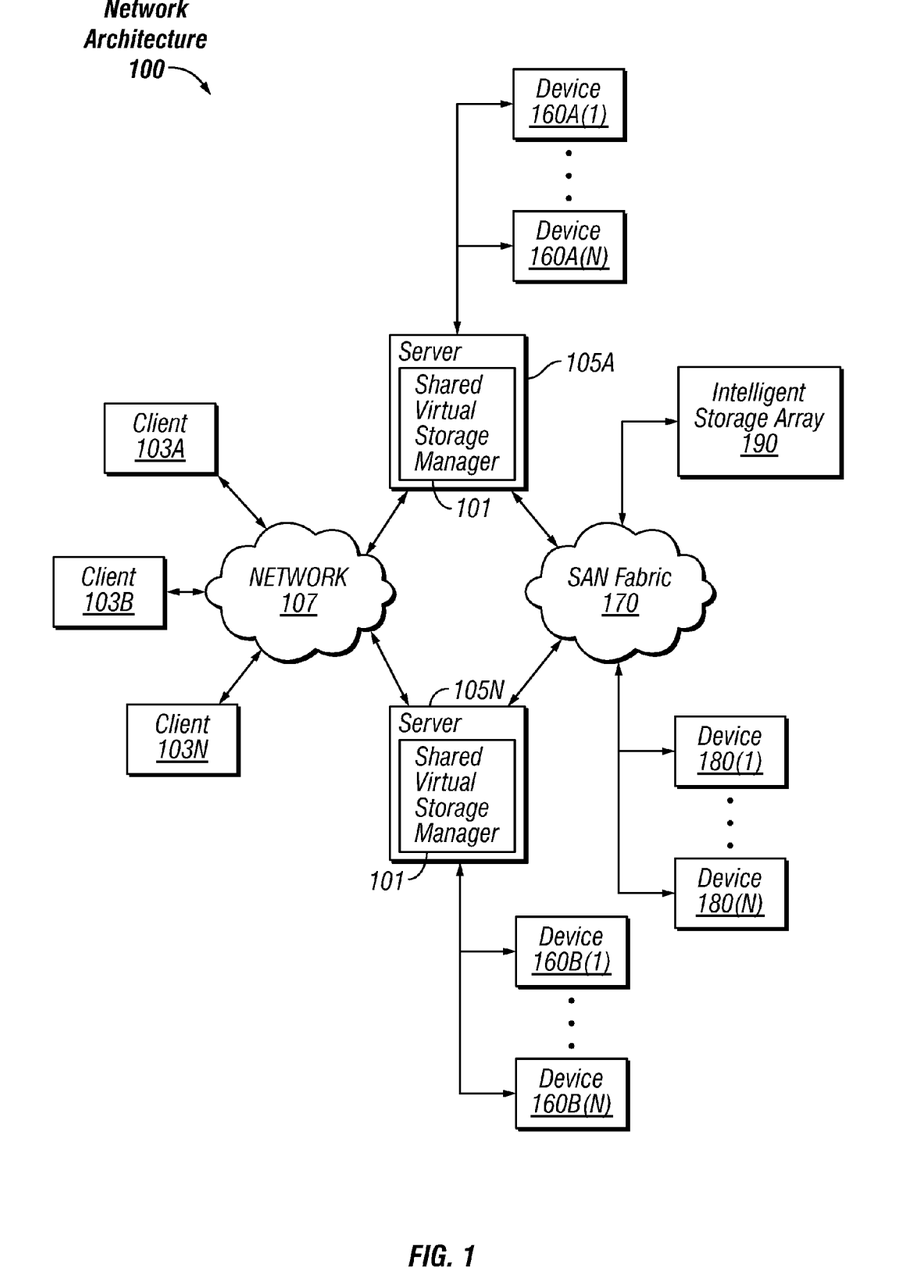
FIG. 1 is a block diagram of an exemplary network architecture in which a shared virtual storage manager can be implemented, according to some embodiments.

FIG. 1 is a block diagram illustrating an exemplary network architecture 100 in which a shared virtual storage manager 101 can be implemented. In the illustrated network architecture 100, client systems 103A, 103B and 103N, as well as servers 105A and 105N, are communicatively coupled to a network 107. A shared virtual storage manager 101 is illustrated as residing on servers 105A and 105N, but in other embodiments the shared virtual storage manager 101 can reside on more, fewer or different computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190.

Although FIG. 1 illustrates three clients 103A-N and two servers 105A-N as an example, in practice many more (or fewer) computers can be deployed. In one embodiment, the network 107 is in the form of the Internet. Other networks 107 or network-based environments can be used in other embodiments.

Figure 2:
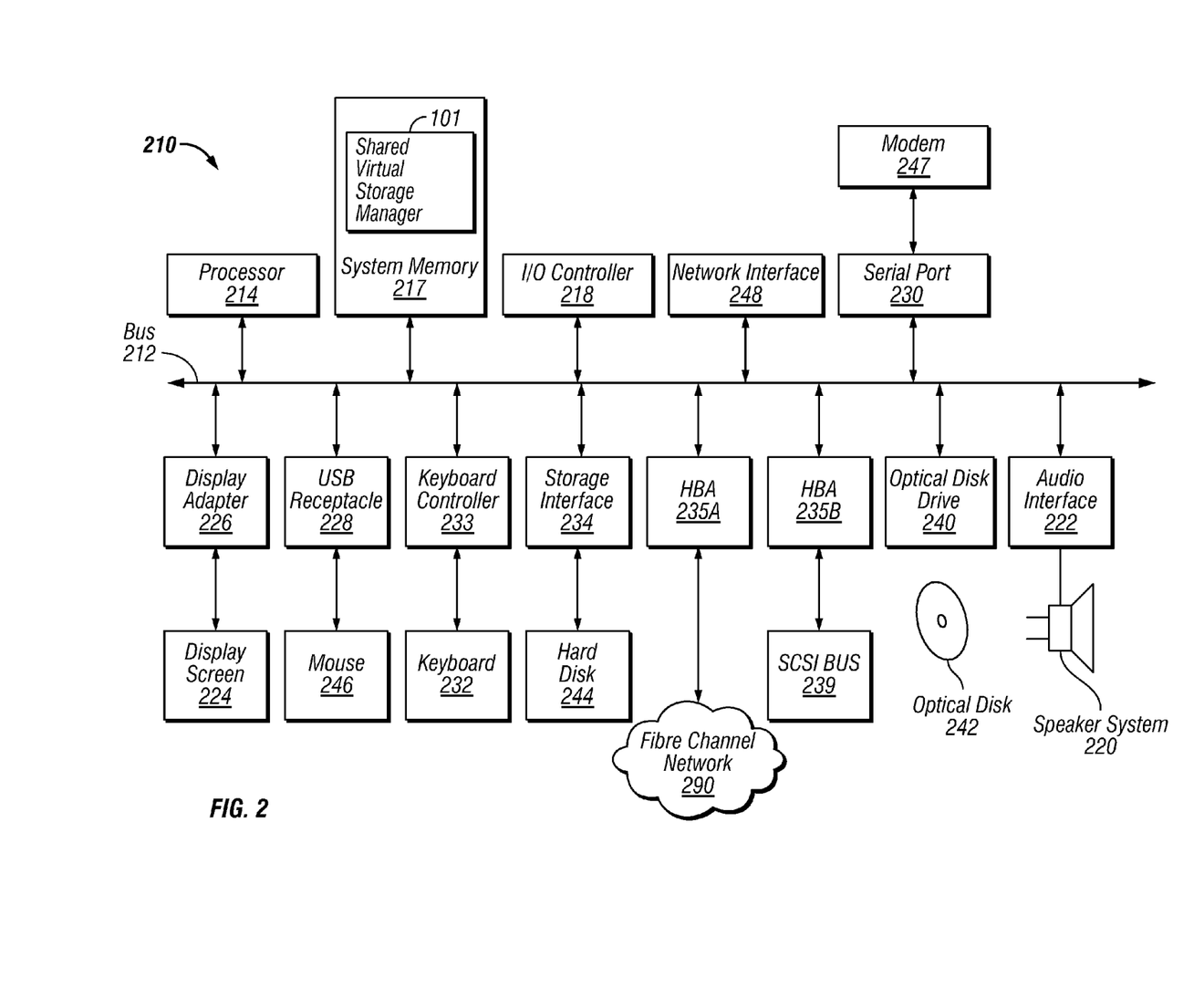
FIG. 2 is a block diagram of a computer system suitable for implementing a shared virtual storage manager, according to some embodiments.

FIG. 2 is a block diagram of a computer system 210 suitable for implementing a shared virtual storage manager 101. The clients 103 and servers 105 illustrated in FIG. 1 can be in the form of computers 210 such as the one illustrated in FIG. 2. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the shared virtual storage manager 101 is illustrated as residing in system memory 217. The workings of the shared virtual storage manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Although FIG. 2 illustrates a shared virtual storage manager 101 residing in system memory 217 of a physical computer 210, it is to be understood that a shared virtual storage manager 101 can also reside in the system memory 217 of a virtual machine and run thereon, as described below in conjunction with FIG. 3.

Figure 3:
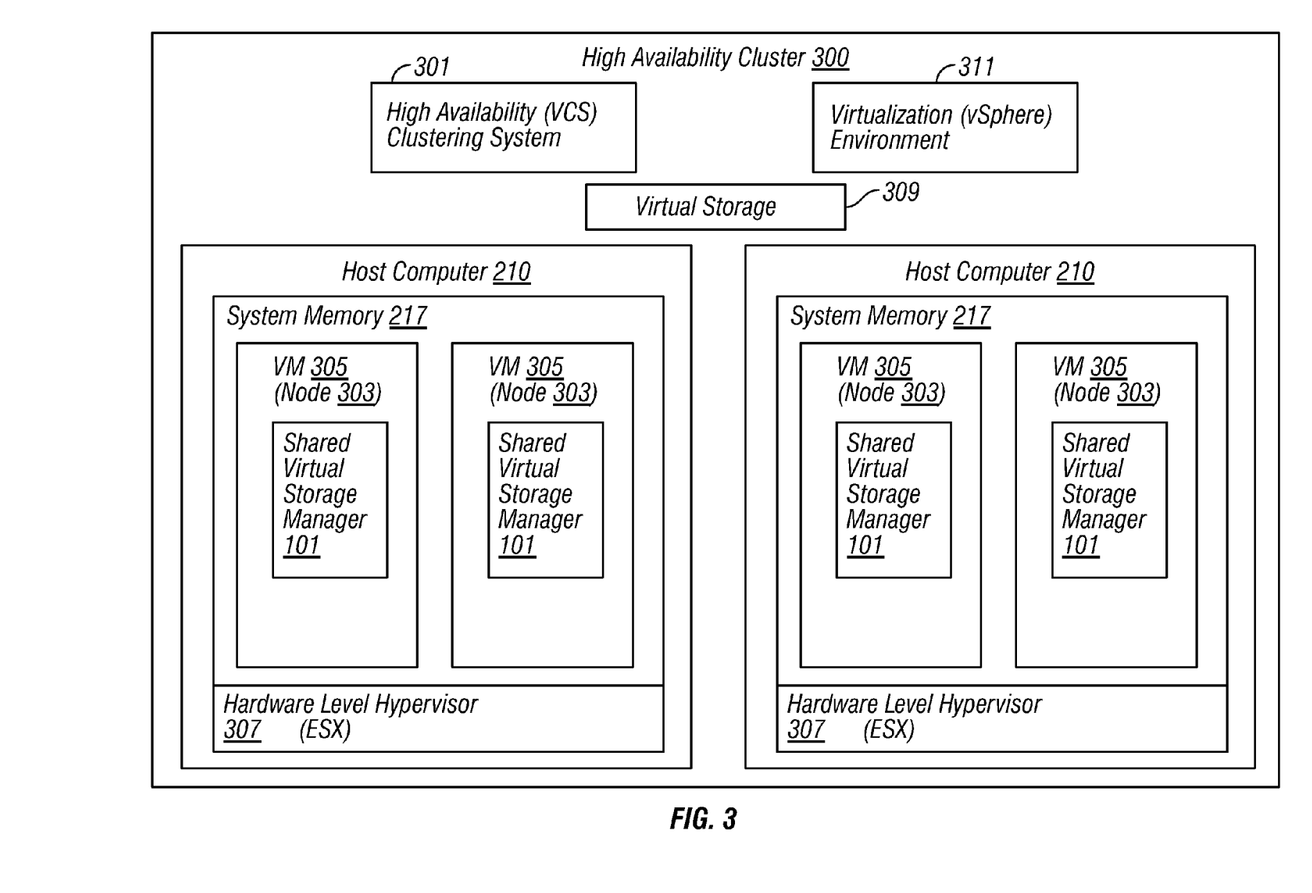
FIG. 3 is a block diagram of the operation of a shared virtual storage manager, according to some embodiments.

FIG. 3 illustrates the operation of a shared virtual storage manager 101, according to some embodiments. FIG. 3 illustrates an instance of a shared virtual storage manager 101 running on each one of multiple virtual machines (VMs) 305. It is to be understood that the functionalities of the shared virtual storage manager 101 can reside on a (virtual or physical) server, client, or be distributed between multiple computer systems 210, including within a cloud-based computing environment in which the functionality of the shared virtual storage manager 101 is provided as a service over a network 107. It is to be understood that although a shared virtual storage manager 101 is illustrated in FIG. 3 as a single entity, the illustrated shared virtual storage manager 101 represents a collection of functionalities, which can be instantiated as a single or multiple modules as desired. It is to be understood that the modules of the shared virtual storage manager 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the shared virtual storage manager 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

FIG. 3 illustrates a high availability cluster 300 instantiated in the context of a high availability clustering system 301 running in conjunction with a virtualization environment 311 (e.g., vSphere). For efficiency of illustration and explanation, both the high availability clustering system 301 and the virtualization environment 311 are illustrated as centralized components. It is to be understood that, in practice, both the high availability clustering system 301 and the virtualization environment 311 contain components that are distributed throughout the high availability cluster 300. FIG. 3 illustrates a high availability cluster 300 of VMs 305 managed by the high availability clustering system 301. The VMs 305 themselves are provided by the virtualization environment 311, and each VM 305 is a node 303 in the cluster 300. Although FIG. 3 depicts only four nodes 303, it is to be understood that a high availability cluster 300 can contain more (or fewer) than four nodes 303. Each VM 305 runs on a physical host computer 210, for example of the type illustrated in FIG. 2. One or more VMs 305 can run on each host 210 (two VMs 305 per host 210 are illustrated in FIG. 3, although one VM 305 or more than two VMs 305 can run on a single host 210). In addition, a hardware level or "bare metal" hypervisor 307 runs on each physical host computer 210, and acts as the functioning operating system for the VMs 305 and any additional virtualization environment software. As used herein, the term "hardware level hypervisor" means a component that acts as an interface between at least one VM 305 and the hardware of the host computer 210 (as opposed to an operating system running on the host) for at least some services. In one embodiment, the virtualization environment 311 is in the form of software provided by VMware, Inc. In this case, the hardware level hypervisor 307 is in the form of VMware ESX 307. It is to be understood that the name of VMware's hardware level hypervisor 307 can change between product releases (for example, it used to be called ESX Server and in the future could be called something else). In a VMware based virtualization environment 311, the supporting software suite can be VMware vSphere, which is a VMware cloud enabled virtualization software package. VMware vSphere runs on top of ESX. It is to be understood the name of VMware's cloud enabled virtualization software package can change between product releases. As also illustrated in FIG. 3, a shared virtual storage manager 101 runs on each VM 305. It is to be understood that although VMware virtualization environments 311 are discussed herein, other embodiments can be implemented in the context of other virtualization environments 311 that provide similar functionality and features.

In one embodiment, the high availability cluster 300 is implemented using VCS, which as noted above is a specific high availability clustering system 301. In this embodiment, the shared virtual storage manager 101 can be implemented as a VCS agent, which is a process that provides the logic to manage a specific type of resource. In this case, the shared virtual storage manager 101 manages virtual storage 309 (e.g., under VMware, the shared virtual storage manager 101 manages a set of one or more VMware disk(s)). In a VCS configuration within a virtualization environment 311, this is typically the resource with the bottom most dependency in the resource hierarchy, meaning that it is brought online before higher level resources and taken offline after. To illustrate, typically a database depends on a file system, which in turn depends on a volume, which in turn depends on a disk group, such that the disk group is the first resource to be brought online and the last to be taken offline, within the context of the database/file system/volume/disk group hierarchy. It is to be understood that although VCS is discussed herein, other embodiments are implemented in the context of other high availability clustering systems 301 such as Microsoft Cluster Server.

The shared virtual storage manager 101 communicates directly with the hardware level hypervisor 307 (e.g., VMware ESX) as opposed to a higher level virtualization management platform such as VMware's Vcenter. This is so because network division might exist between VMs 305 (nodes 303 of the cluster 300) or hosts 210, but an instance of the hardware level hypervisor 307, as opposed to a higher level centralized virtualization environment 311 component, is present on each host 210. Running at this level, the shared virtual storage manager 101 performs the functionality described in detail below to circumvent the above-described shared virtual storage limitations under different circumstances, and thereby provides compatibility between the high availability clustering system 301 which supports failover of monitored applications 401 and the virtualization environment 311 which utilizes virtual storage 309, without conflicting with features such as Vmotion, storage Vmotion, DRS, snapshots, and VMware HA (in other embodiments, these types of features can have different names). Furthermore, by using the specific techniques described in detail below, the shared virtual storage manager 101 enables the high availability clustering system 301 to share storage and to failover monitored applications 401 in conjunction with the virtualization environment 311, without requiring the replication of storage media (e.g., data disks). This is important because the replication of storage media such as data disks is inefficient, and can cause data loss and lower levels of service in the case of the failover of an application 401.

Figure 4:
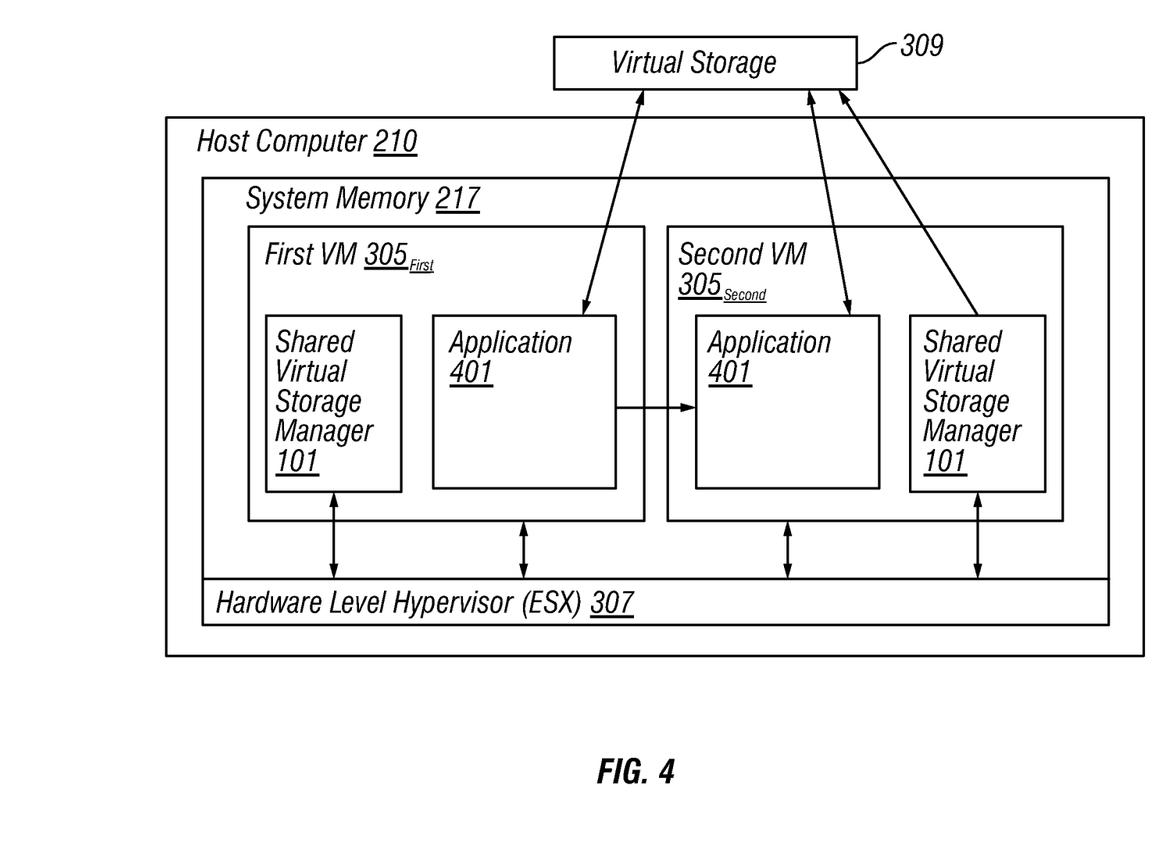
FIG. 4 is a block diagram of a shared virtual storage manager supporting the failure of an application and the failure of a VM, according to some embodiments.

FIG. 4 illustrates scenarios in which the shared virtual storage manager 101 provides compatibility between the high availability clustering system 301 and the virtualization environment 311 under the specific circumstance of an application 401 being failed over from a first VM $305_{first}$ to a second VM $305_{second}$. This can occur in a context in which the first VM $305_{first}$ and the second VM $305_{second}$ are both running on a single host computer 210, and hence on a single hardware level hypervisor 307 (e.g., VMware ESX), as illustrated in FIG. 4. The failover of an application 401 between VMs 305 can also occur in the context in which the first VM $305_{first}$ is running on a first host 210 and the second VM $305_{second}$ is running on a second second host 210 (VMs 305 running on separate hosts 210 are illustrated in FIG. 3). In either case, an application 401 that is running on the first VM $305_{first}$ and being monitored by the high availability clustering system 301 can fail, meaning that the application crashes, locks-up, exits with an error code or otherwise ceases to run.

As noted above, the high availability clustering system 301 detects the failure of a monitored application 401, and attempts to restart the application 401 on the system on which it was running, which in this case is the first VM $305_{first}$. If the number of restart attempts which the high availability clustering system 301 is configured to make are made and the application 401 cannot be successfully restarted on the first VM $305_{first}$, the high availability clustering system 301 fails over the application 401 from the first VM $305_{first}$ to the second VM $305_{second}$. Because the application 401 is running on a VM 305 in a virtualization environment 311 (e.g., VMware) as opposed to running directly on a physical server 105, the application 401 utilizes virtual storage 309 to access its data. When the application was running on the first VM $305_{first}$, that virtual storage was attached to the first VM $305_{first}$. In order to support the failover of the application 401 to the second VM $305_{second}$, the virtual storage 309 that is utilized by the application 401 must be made available to the application 401 when it is restarted on the second VM $305_{second}$. Under a high availability clustering system 301 in a non-virtualized environment in which an application 401 is failed over between physical servers 105, each physical server 105 is provided with access to non-virtual shared storage, so an application 401 has access to its data on the server 105 to which it is failed over. However, in the virtualization environment 311, the shared storage is in the form of virtual storage 309 which can only be attached to one VM 305 at a time. Note that the virtualization environment 311 itself does not know that the application 401 is being failed over between VMs 305, and does not support the sharing of the virtual storage 309.

To overcome these issues, in one embodiment the shared virtual storage manager 101 running on the target (second) VM $305_{second}$ detects that the application 401 is being failed over to the target (second) VM $305_{second}$, detaches the virtual storage 309 from the first VM $305_{first}$, and attaches the virtual storage 309 to the second VM $305_{second}$, thus making the virtual storage 309 available to the application 401 on the second VM $305_{second}$. In another embodiment, the shared virtual storage manager 101 on the source (first) VM $305_{first}$ detaches the virtual storage 309 from the first VM $305_{first}$, and the shared virtual storage manager 101 running on the second VM $305_{second}$ attaches the virtual storage 309 to the second VM $305_{second}$. The high availability clustering system 301 restarts the application 401 on the second VM $305_{second}$. Because the virtual storage 309 is now attached to the second VM $305_{second}$, the application 401 that was failed over has access to the virtual storage 309 and hence its data. Thus, the shared virtual storage manager 101 provides compatibility between the high availability clustering system 301 and the virtualization environment 311.

FIG. 4 also illustrates another circumstance under which the shared virtual storage manager 101 provides compatibility between the high availability clustering system 301 and the virtualization environment 311, which is when an application 401 is running on a first VM $305_{first}$ and the first VM $305_{first}$ fails. Note that this scenario is distinct from failing over an application 401 between VMs 305 because the application 401 failed and could not be restarted. By contrast, in this case it is the underlying VM 305 on which the monitored application 401 was running that failed, and it is for this reason that the application 401 is failed over. As illustrated in FIG. 4, the high availability clustering system 301 detects the failure of the first VM $305_{first}$ and fails over the monitored application 401 that was running thereon to a second VM $305_{second}$. As with the above-described scenario in which it is the application 401 that failed, to support the failover of the application 401 to the second VM $305_{second}$, the virtual storage 309 that is utilized by the application 401 must be made available on the second VM $305_{second}$. Therefore, as described above in the failed application 401 scenario, the shared virtual storage manager 101 running on the target (second) VM $305_{second}$ detects that the application 401 is being failed over thereto. In response, the shared virtual storage manager 101 running on the second VM $305_{second}$ detaches the virtual storage 309 from the first VM $305_{first}$, and attaches the virtual storage 309 to the second VM $305_{second}$, thus making the virtual storage 309 available to the application 401 on the second VM $305_{second}$. In another embodiment, the shared virtual storage manager 101 on the source (first) VM $305_{first}$ detaches the virtual storage 309 from the first VM $305_{first}$, and the shared virtual storage manager 101 running on the second VM $305_{second}$ attaches the virtual storage 309 to the second VM $305_{second}$.

Figure 5A:
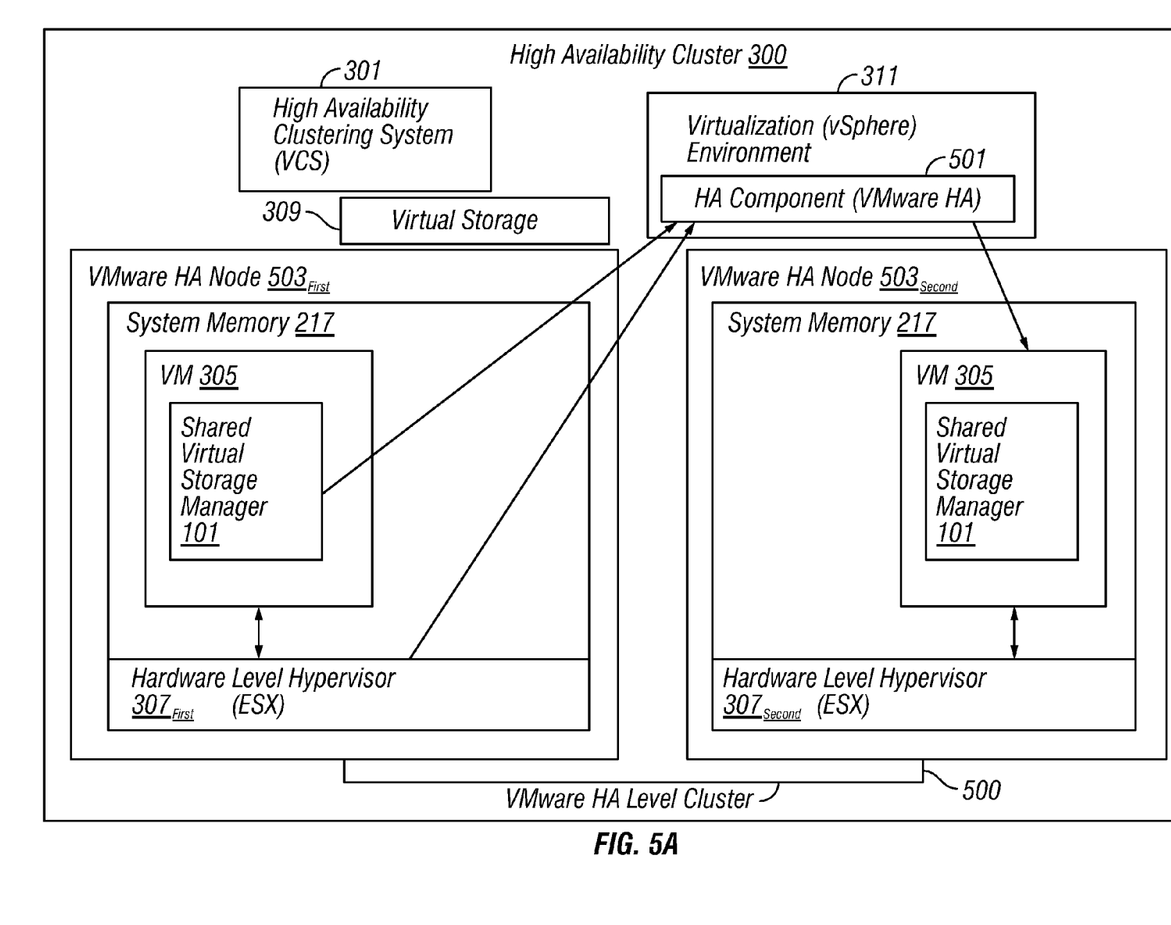
FIGS. 5A-5B are block diagrams of a shared virtual storage manager supporting the failure of a hardware level hypervisor, according to some embodiments.
Figure 5B:
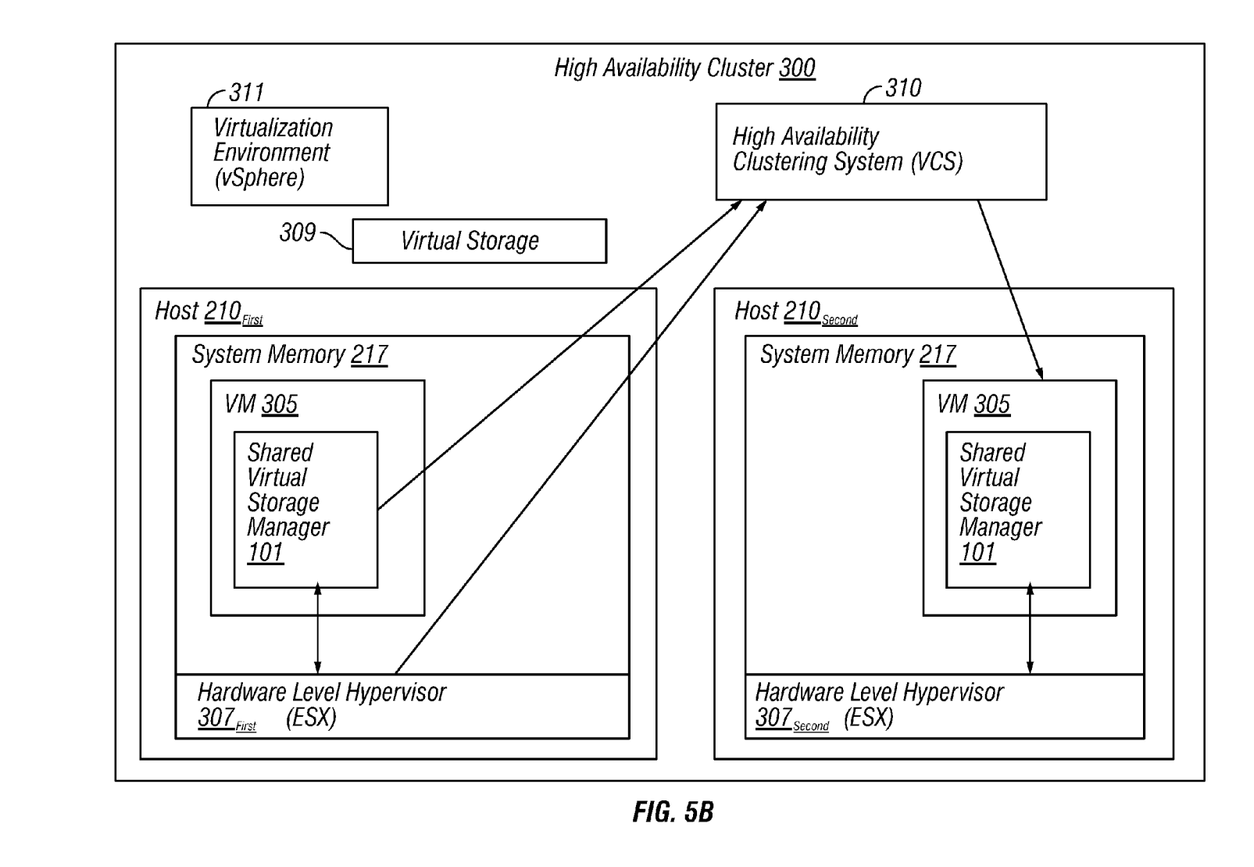

FIGS. 5A-5B illustrate the actions of the shared virtual storage manager 101 providing compatibility between the high availability clustering system 301 and the virtualization environment 311 under scenarios in which a hardware level hypervisor 307 (e.g., VMware ESX) fails. In one such scenario illustrated in FIG. 5A, VMware HA 501 (or another virtualization environment component providing similar high availability functionality for VMs 305) is present. As noted above, VMware HA 501 provides high availability for VMs 305 in a virtualization environment 311 when ESX fails. More specifically, VMware HA 501 creates and manages a cluster 500 of host computers 210 running ESX, which is distinct from the cluster 300 of VMs 305 being managed by the high availability clustering system 301. VMware HA 501 detects a failure of an instance of ESX, (the hardware level hypervisor 307 on which one or more VMs 305 are running), and in response fails over the VM(s) 305 to another hardware level hypervisor 307. Note that in this scenario the failed (first) hardware level hypervisor $307_{first}$ is on a first node $503_{first}$ in the VMware HA 501 level cluster 500 (a first host computer 210) and the target (second) hardware level hypervisor $307_{second}$ is on a second node $503_{second}$ in the VMware HA 501 level cluster 500 (a second host computer 210). Note that for efficiency of illustration and understanding, FIG. 5A illustrates a single VM 305, but as discussed above multiple VMs 305 can run on a single hardware level hypervisor 307 (FIG. 3 illustrates such a scenario). As further illustrated in FIG. 5A, an application 401 being monitored by the high availability clustering system 301 runs on the VM 305.

When the first hardware level hypervisor $307_{first}$ running on the first VMware HA node $503_{first}$ fails in a virtualization environment 311 such as the one illustrated in FIG. 5A in which VMware HA 501 (or a similar component) is present, the high availability clustering system 301 detects the failure of the hypervisor $307_{first}$ but does not interfere with the actions of VMware HA 501. VMware HA 501 also detects the failure of first hardware level hypervisor $307_{first}$, and fails over the VM 303 running thereon to the second hardware level hypervisor $307_{second}$ on the second VMware HA node $503_{second}$. When the VM 303 is failed over and restarted on the second hardware level hypervisor $307_{second}$, the high availability clustering system 301 detaches the virtual storage 309 from the VM 305 on the failed (first) hypervisor $307_{first}$, attaches the virtual storage 309 to the failed over VM 305, now running on the second hardware level hypervisor $307_{second}$, and restarts the monitored application 401 the on the VM 305 on the second hardware level hypervisor $307_{second}$.

FIG. 5B illustrates a scenario in which the first hardware level hypervisor $307_{first}$ running on the first physical host computer $210_{first}$ fails in a virtualization environment 311, in which VMware HA 501 is not present to failover the VM 305. In this scenario, the failure is detected by the high availability clustering system 301, which fails over the application 401 that was running on the VM 305 running on the failed (first) hardware level hypervisor $307_{first}$ to a second VM $305_{second}$ running on a second hardware level hypervisor $307_{second}$ on a second physical host computer $210_{second}$. To support the failover of the application 401 to the second VM $305_{second}$, the virtual storage 309 that is utilized by the application 401 must be made available on the second VM $305_{second}$. Therefore, as described above in the failed application 401 and failed VM 305 scenarios, the shared virtual storage manager 101 running on the target (second) VM $305_{second}$ detects that the application 401 is being failed over thereto, detaches the virtual storage 309 from the first VM $305_{first}$ and attaches it to the second VM $305_{second}$, thus making the virtual storage 309 available to the application 401 on the second VM $305_{second}$. In another embodiment, the shared virtual storage manager 101 on the first VM $305_{first}$ detaches the virtual storage 309 from the first VM $305_{first}$, and the shared virtual storage manager 101 on the second VM $305_{second}$ attaches the virtual storage 309 to the second VM $305_{second}$.

Figure 6:
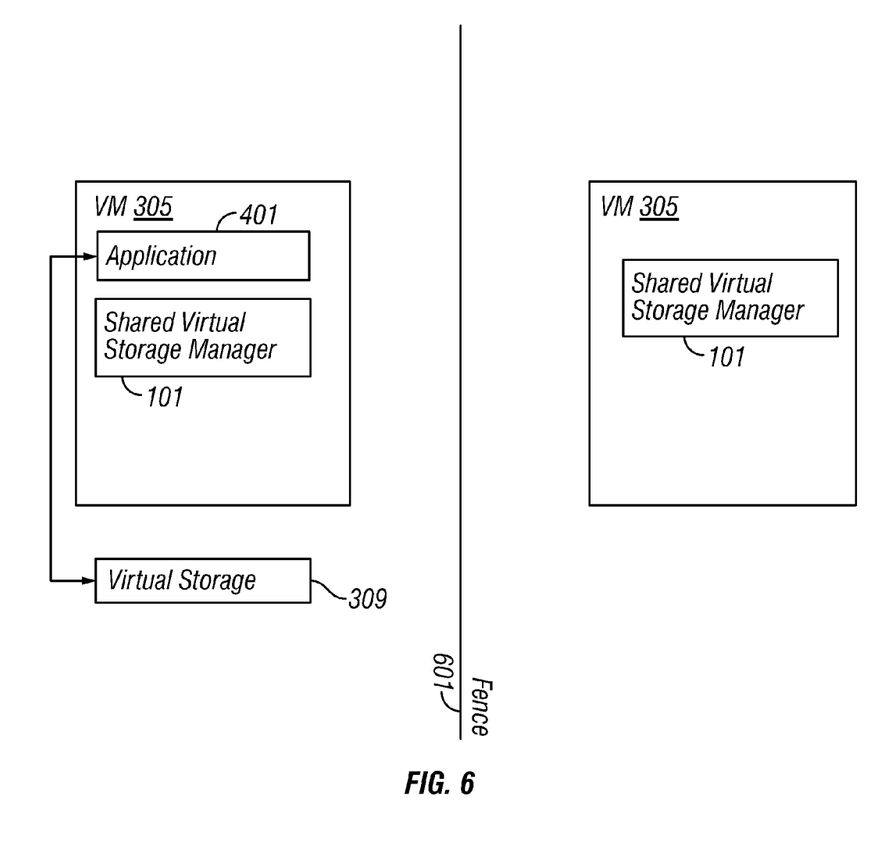
FIG. 6 is a block diagram of a shared virtual storage manager supporting resolution of an occurrence of split brain, according to some embodiments.

FIG. 6 illustrates another context in which the shared virtual storage manager 101 provides compatibility between the high availability clustering system 301 and the virtualization environment 311, which is the scenario of resolving an occurrence of split brain. Split brain occurs when two independent nodes 303 in a cluster 300 become communicatively disconnected from each other, and each falsely assumes that the other is no longer running. This can result from the failure of interconnection components in the cluster 300. The resulting condition can be described as a fence 601 existing between the nodes 303, wherein there is no communication through the fence 601. As a result, the node 303 on each side of the fence 601 assumes it has exclusive access to resources including shared storage 309. To solve the problem of split brain, the node(s) 303 on one side of the fence 601 or the other should be taken offline, or at least denied access to the shared storage 309. Thus, in this scenario, a decision needs to be made as to which side of the fence 601 is to have its nodes 303 remain in operation and which is to be taken down.

In the context of a high availability clustering system 301 running in conjunction with a virtualization environment 311, two separate VMs 305 can become fenced off from each other when split brain occurs. By virtue of the high availability clustering system 301, each VM 305 (which is functioning as a node 303 in the high availability cluster 300 under the high availability clustering system 301) attempts to take control of and run the monitored application 401. To resolve the occurrence of split brain, the shared virtual storage manager 101 in effect uses the shared virtual storage 309 as an arbitrator. To do so, the shared virtual storage manager 101 on the VM 305 to which the shared virtual storage 309 is attached (and on which the monitored application 401 is actually running) maintains the attachment between the VM 305 and the shared virtual storage 309 (e.g., the VM 305 continues to hold the lock on the VMware disk(s)). Hence, any other VMs 305 attempting to attach the shared virtual storage 309 (acquire the lock) are unable to do so. Thus, the application 401 continues to run on the same VM 305 and remains stable, despite the occurrence of split brain.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for providing compatibility between a high availability clustering system supporting failover of monitored applications and a virtualization environment utilizing virtual storage, the method comprising the steps of:
   providing a high availability cluster comprising at least two nodes, wherein each node comprises a VM (virtual machine);
   providing a high availability clustering system supporting failover of monitored applications;
   providing a virtualization environment utilizing virtual storage and running in conjunction with the high availability clustering system, wherein a hardware level hypervisor runs on each of at least one physical host computer(s), and wherein at least one VM comprising a node in the high availability cluster runs on each hardware level hypervisor; and
   sharing virtual storage of the virtualization environment between multiple VMs, thereby enabling the high availability clustering system to share storage and to failover monitored applications in conjunction with the virtualization environment utilizing virtual storage, without requiring replication of storage media.

2. The method of claim 1 wherein sharing virtual storage of the virtualization environment between multiple VMs further comprises:
   detecting that a specific monitored application is being failed over from a source VM to a target VM in response to the specific monitored application failing;
   detaching virtual storage that was being accessed by the specific monitored application from the source VM; and
   attaching the virtual storage to the target VM, by a component running on the target VM, thereby providing the specific monitored application with access to the virtual storage on the target VM.

3. The method of claim 2 wherein:
   the source VM and the target VM are both running on a single hardware level hypervisor, the single hardware level hypervisor running on a single host computer.

4. The method of claim 2 wherein:
   the source VM is running on a first hardware level hypervisor, the first hardware level hypervisor running on a first host computer; and
   the target VM is running on a second hardware level hypervisor, the second hardware level hypervisor running on a second host computer.

5. The method of claim 1 wherein sharing virtual storage of the virtualization environment between multiple VMs further comprises:
   detecting that a specific monitored application is being failed over from a source VM to a target VM in response to the source VM failing;
   detaching virtual storage from the source VM; and
   attaching the virtual storage to the target VM, by a component running on the target VM, thereby providing the specific monitored application with access to the virtual storage on the target VM.

6. The method of claim 5 wherein:
   the source VM and the target VM are both running on a single hardware level hypervisor, the single hardware level hypervisor running on a single host computer.

7. The method of claim 5 wherein:
the source VM is running on a first hardware level hypervisor, the first hardware level hypervisor running on a first host computer; and
the target VM is running on a second hardware level hypervisor, the second hardware level hypervisor running on a second host computer.

8. The method of claim 1 wherein sharing virtual storage of the virtualization environment between multiple VMs further comprises:
attaching virtual storage that was being accessed by the specific monitored application to a VM running on a target hardware level hypervisor, responsive to a failure of a source hardware level hypervisor, wherein the specific monitored application was running on a VM on the source hardware level hypervisor, thereby providing the specific monitored application with access to the virtual storage on the VM on the target hardware level hypervisor.

9. The method of claim 8 wherein the virtualization environment further provides high availability functionality for VMs running on a failed hardware level hypervisor, the method further comprising:
responsive to the failure of the source hardware level hypervisor, allowing the virtualization environment to failover the VM on the source hardware level hypervisor to the target hardware level hypervisor;
detaching virtual storage from the VM on the source hardware level hypervisor; and
attaching the virtual storage to the VM that was failed over to the target hardware level hypervisor.

10. The method of claim 8 wherein the virtualization environment does not further provide high availability functionality for VMs running on a failed hardware level hypervisor, the method further comprising:
responsive to the failure of the source hardware level hypervisor, failing over the specific monitored application from the VM running on the source hardware level hypervisor to a separate VM running on the target hardware level hypervisor;
detaching virtual storage from the VM running on the source hardware level hypervisor; and
attaching the virtual storage to the separate VM running on the target hardware level hypervisor.

11. The method of claim 1 further comprising:
using virtual storage as an arbitrator to resolve an occurrence of split brain in the high availability cluster, wherein the occurrence of split brain further comprises separate VMs having become communicatively disconnected and the high availability clustering system attempting to run a specific monitored application on each one of the separate VMs.

12. The method of claim 11 wherein using virtual storage as an arbitrator to resolve an occurrence of split brain in the high availability cluster further comprises:
maintaining an attachment between a specific one of the VMs on which the specific monitored application is running and the shared storage, such that the other ones of the VMs are unable to attach the virtual storage and run the specific monitored application, thereby enabling the specific monitored application to continue to run on the specific one of the VMs and to remain stable, despite the occurrence of split brain.

13. At least one non-transitory computer readable-storage medium for providing compatibility between a high availability clustering system supporting failover of monitored applications and a virtualization environment utilizing virtual storage, the at least one non-transitory computer readable-storage medium storing computer executable instructions that, when loaded into computer memory and executed by at least one processor of a computing device, cause the computing device to perform the following steps:
providing a high availability cluster comprising at least two nodes, wherein each node comprises a VM (virtual machine);
providing a high availability clustering system supporting failover of monitored applications;
providing a virtualization environment utilizing virtual storage and running in conjunction with the high availability clustering system, wherein a hardware level hypervisor runs on each of at least one physical host computer(s), and wherein at least one VM comprising a node in the high availability cluster runs on each hardware level hypervisor; and
sharing virtual storage of the virtualization environment between multiple VMs, thereby enabling the high availability clustering system to share storage and to failover monitored applications in conjunction with the virtualization environment utilizing virtual storage, without requiring replication of storage media.

14. The at least one non-transitory computer readable-storage medium of claim 13 wherein sharing virtual storage of the virtualization environment between multiple VMs further comprises:
detecting that a specific monitored application is being failed over from a source VM to a target VM in response to the specific monitored application failing;
detaching virtual storage that was being accessed by the specific monitored application from the source VM; and
attaching the virtual storage to the target VM, by a component running on the target VM, thereby providing the specific monitored application with access to the virtual storage on the target VM.

15. The at least one non-transitory computer readable-storage medium of claim 13 wherein sharing virtual storage of the virtualization environment between multiple VMs further comprises:
detecting that a specific monitored application is being failed over from a source VM to a target VM in response to the source VM failing;
detaching virtual storage from the source VM; and
attaching the virtual storage to the target VM, by a component running on the target VM, thereby providing the specific monitored application with access to the virtual storage on the target VM.

16. The at least one non-transitory computer readable-storage medium of claim 13 wherein sharing virtual storage of the virtualization environment between multiple VMs further comprises:
attaching virtual storage that was being accessed by the specific monitored application to a VM running on a target hardware level hypervisor, responsive to a failure of a source hardware level hypervisor, wherein the specific monitored application was running on a VM on the source hardware level hypervisor, thereby providing the specific monitored application with access to the virtual storage on the VM on the target hardware level hypervisor.

17. The at least one non-transitory computer readable-storage medium of claim 16 wherein the virtualization environment further provides high availability functionality for VMs running on a failed hardware level hypervisor, the at least one non-transitory computer readable-storage medium further storing computer executable instructions to perform the following additional steps:
- responsive to the failure of the source hardware level hypervisor, allowing the virtualization environment to failover the VM on the source hardware level hypervisor to the target hardware level hypervisor;
- detaching virtual storage from the VM on the source hardware level hypervisor; and
- attaching the virtual storage to the VM that was failed over to the target hardware level hypervisor.

18. The at least one non-transitory computer readable-storage medium of claim 16 wherein the virtualization environment does not further provide high availability functionality for VMs running on a failed hardware level hypervisor, the at least one non-transitory computer readable-storage medium further storing computer executable instructions to perform the following additional steps:
- responsive to the failure of the source hardware level hypervisor, failing over the specific monitored application from the VM running on the source hardware level hypervisor to a separate VM running on the target hardware level hypervisor;
- detaching virtual storage from the VM running on the source hardware level hypervisor; and
- attaching the virtual storage to the separate VM running on the target hardware level hypervisor.

19. The at least one non-transitory computer readable-storage medium of claim 13 further storing computer executable instructions to perform the following additional step:
- using virtual storage as an arbitrator to resolve an occurrence of split brain in the high availability cluster, wherein the occurrence of split brain further comprises separate VMs having become communicatively disconnected and the high availability clustering system attempting to run a specific monitored application on each one of the separate VMs.

20. A computer system for providing compatibility between a high availability clustering system supporting failover of monitored applications and a virtualization environment utilizing virtual storage, the computer system comprising:
- a high availability cluster comprising at least two nodes, wherein each node comprises a VM (virtual machine);
- a high availability clustering system supporting failover of monitored applications;
- a virtualization environment utilizing virtual storage and running in conjunction with the high availability clustering system, wherein a hardware level hypervisor runs in system memory of each of at least one physical host computer(s), and wherein at least one VM runs on each hardware level hypervisor, in the system memory of the corresponding physical host computer; and
- a shared virtual storage manager running on each VM (virtual machine), each shared virtual storage manager being programmed to share virtual storage of the virtualization environment between multiple VMs, thereby enabling the high availability clustering system to share storage and to failover monitored applications in conjunction with the virtualization environment utilizing virtual storage, without requiring replication of storage media.

* * * * *